United States Patent [19]

Powers et al.

[11] Patent Number: 5,404,512

[45] Date of Patent: Apr. 4, 1995

[54] METHOD FOR ACCESSING A DATABASE WITH MULTI-DIMENSIONAL SEARCH TREE NODES

[75] Inventors: Frederick A. Powers, Sudbury; Stanley R. Zanarotti, Cambridge, both of Mass.

[73] Assignee: Dimensional Insight, Inc., Burlington, Mass.

[21] Appl. No.: 79,248

[22] Filed: Jun. 17, 1993

Related U.S. Application Data

[62] Division of Ser. No. 495,360, Mar. 16, 1990, Pat. No. 5,257,365.

[51] Int. Cl.$^6$ ............................................. G06F 15/40
[52] U.S. Cl. .................................................... 395/600
[58] Field of Search ........................................ 395/600

[56] References Cited

U.S. PATENT DOCUMENTS

| | | | |
|---|---|---|---|
| 3,568,155 | 3/1971 | Abraham et al. | 340/172.5 |
| 4,742,467 | 5/1988 | Messerich et al. | 364/200 |
| 4,791,561 | 12/1988 | Huber | 364/200 |
| 5,291,583 | 3/1994 | Bapat | 395/500 |

Primary Examiner—Thomas G. Black
Assistant Examiner—Peter Y. Wang
Attorney, Agent, or Firm—Gary D. Clapp

[57] ABSTRACT

The subject invention is directed to a database system for organizing large amounts of data to be accessed by a digital computer. More particularly, a free form type database, in the form of a summarized, multikey tree, is built from files stored on the computer. After a building operation, the user obtains specified information by using the summarized database. Information in the files is divided into three categories; that is, a dimension field which comprises data to be organized, a summary field which comprises a numeric quantity on which calculations can be performed, and a non-summary field which comprises other information associated with an input record. The internal nodes of the tree summarize and organize sets of input records. Methods are provided for reducing the amount of storage space used by cutting off the tree when the size of sets go below a given threshold, and sharing parts of the tree so that each record does not appear n! times in the database.

3 Claims, 9 Drawing Sheets

METHOD FOR ACCESSING A DATABASE WITH MULTI-DIMENSIONAL SEARCH TREE NODES

CROSS REFERENCES TO RELATED APPLICATIONS

The present patent application is a Divisional patent application from U.S. patent application Ser. No. 07/495,360, for MULTI-DIMENSIONAL SUMMARY DATABASE SYSTEM AND METHOD by Frederick A Powers and Stanley R. Zanarotti, filed Mar. 16, 1990, now U.S. Pat. No. 5,257,365.

The present patent application is related to U.S. patent application Ser. No. 07/495,360 by Frederick A. Powers and Stanley R. Zanarotti for MULTI-DIMENSIONAL SUMMARY DATABASE SYSTEM AND METHOD by Frederick A Powers and Stanley R. Zanarotti, filed on the same date as the present patent application;

U.S. patent application Ser. No. 08/079,249 by Frederick A. Powers and Stanley R. Zanarotti for MULTI-DIMENSIONAL SUMMARY DATABASE SYSTEM AND METHOD by Frederick A Powers and Stanley R. Zanarotti, filed on the same date as the present patent application; and, U.S. patent application Ser. No. 08/078,396 by Frederick A. Powers and Stanley R. Zanarotti for MULTI-DIMENSIONAL SUMMARY DATABASE SYSTEM AND METHOD by Frederick A Powers and Stanley R. Zanarotti, filed on the same date as the present patent application.

The above referenced U.S. patent applications are assigned to the assignee of the present U.S. patent application.

REFERENCE PUBLICATIONS

"Multi-attribute Retrieval with Combined Indexes", November 1970, Communications of the ACM, pp 660–665, Vol 13, Number 11.

BACKGROUND OF THE INVENTION

1. Field of the invention

This invention relates to methods of storing and accessing data on digital computers, and in particular, to an improved data base system for organizing large amounts of data for fast retrieval and processing.

2. Description of the Prior Art

Databases are used to store large amounts of data in digital computers. To analyze this data, users need to be able to identify sets of records based on a combination of attributes and generate summary information, such as sums, averages, and other statistical functions, for these sets.

Traditional databases may provide support for identifying some of these sets, but not all of them in an efficient manner. Multidimensional databases can provide fast access to more sets, for a small number of attributes. Even so, providing summary information on a set requires accessing all elements of that set, and is a time-consuming operation for large sets thereby delaying interactive queries for this information.

The following U.S. Patents disclose typical database management systems.

U.S. Pat. No. 4,554,631, entitled "Keyword Search Automatic Limiting Method."

U.S. Pat. No. 4,606,002, entitled "B-Tree Structured Data Base Using Spare Array Bit Maps to Store Inverted Lists."

U.S. Pat. No. 4,611,272, entitled "Key-Accessed File Organization."

U.S. Pat. No. 4,468,728, entitled "Data Structure and Search Method for a Data Base Management System."

OBJECT OF THE INVENTION

Accordingly, it is a primary object of the invention to have an improved database management system.

It is an object of the invention to have a database management system for providing rapid summary information for large sets of records.

SUMMARY OF THE INVENTION

The above objects and advantages are achieved in a preferred embodiment of the present invention. According to the preferred embodiment, a data base management system for storing and accessing data provides fast interactive access to summary information for different sets of input records, where the sets are defined by specifying values for multiple attributes. The method involves calculating a large portion of this summary information and building it into a data structure. At access time, users specify sets by giving values for multiple attributes, and the data structure is searched for the appropriate summary information for that set. If found, the summary information is displayed; otherwise, the summary information is calculated from the records themselves.

The data structure consists of the original data in a relational detail table, a summary tree structure for organizing and summarizing the data along several dimension fields, and key value tables for encoding dimension field values as integers.

Key info tables store information associated with dimension field values, for convenient reference. The summary tree is a search tree where internal nodes describe and summarize numeric fields in sets of records. Nodes deeper in the tree describe more specific sets of records, until the size of the set is smaller than a given threshold, at which point the individual records of the set are indexed by a detail index node. The tree can be represented as a numbered set of tables.

At access time, the user specifies a set of dimension values. The summary tree is walked using these values to find the appropriate node. If the node is a summary node, the summary information is displayed. If the node is a detail index node, the set of records is read from the detail table, and the summary information is calculated from this set.

BRIEF DESCRIPTION OF THE DRAWINGS

The novel features which are believed to be characteristic of the invention both as to its organization and method of operation, together with further objects and advantages will be better understood from the following description when considered in connection with the accompanying drawings. It is expressly understood, however, that each of the drawings is given for the purpose of illustration and description only and is not intended as a definition of the limits of the present invention.

DESCRIPTION OF THE PREFERRED EMBODIMENT

The present invention is a method of storing data in the memory of a data processing system and accessing the data in a manner that provides fast interactive access to summary information for different sets of input records, where the sets are defined by specifying values for multiple search keys. The method involves calculating a large portion of this summary information and building it into a database. When this database is accessed, this summary information is available without having to calculate it. Although the process of building the database may be a time-consuming operation, it can be done when the system is off-line. At access time, when an operator is waiting for an answer, a database query can be answered quickly.

Figure 1:
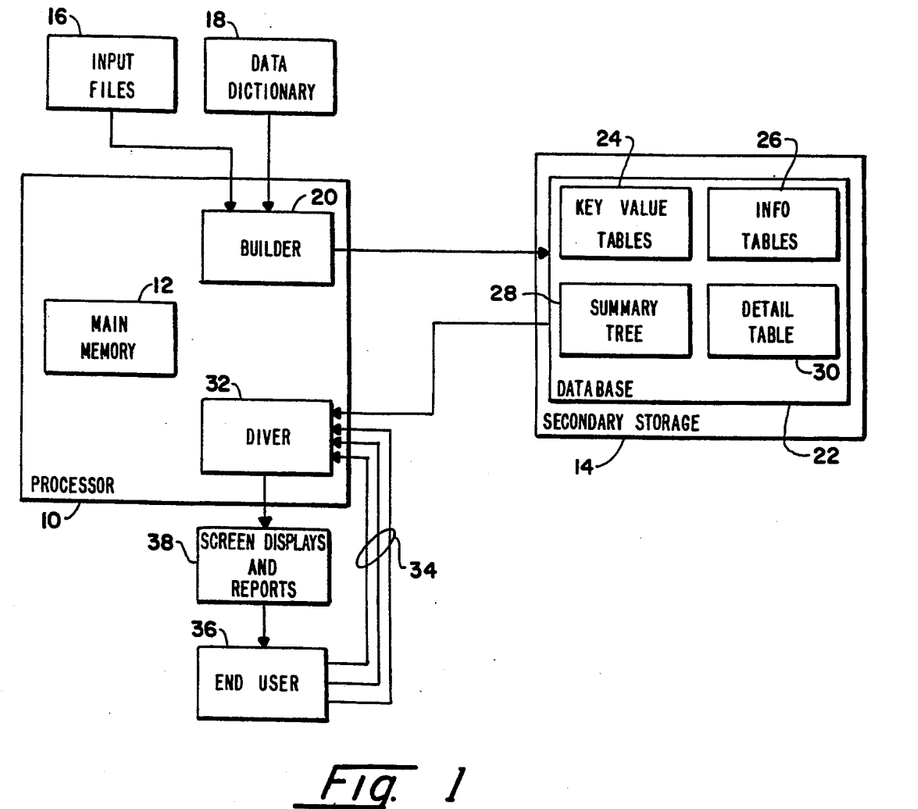
FIG. 1. shows in block diagram form the systems architecture for the invention, illustrating the general process of building and accessing the database.

FIG. 1. shows the system architecture of the present invention. The invention generally comprises a processor 10, a main memory 12, and secondary storage 14. The processor 10 is used to run builder 20 and diver 32 programs, using main memory 12 for temporary storage and intermediate results, and using secondary storage 14 for permanent storage. Input data files 16, described by a data dictionary 18 is fed into the builder program 20. The builder program 20 produces a database 22, which is comprised of key value tables 24, key info tables 26, a summary tree 28, and a detail table 30. The diver program 32, given dimension selections 34 from an end user 36, uses the database 22 to produce screen displays and reports 38 to the end user 36.

Figure 2:
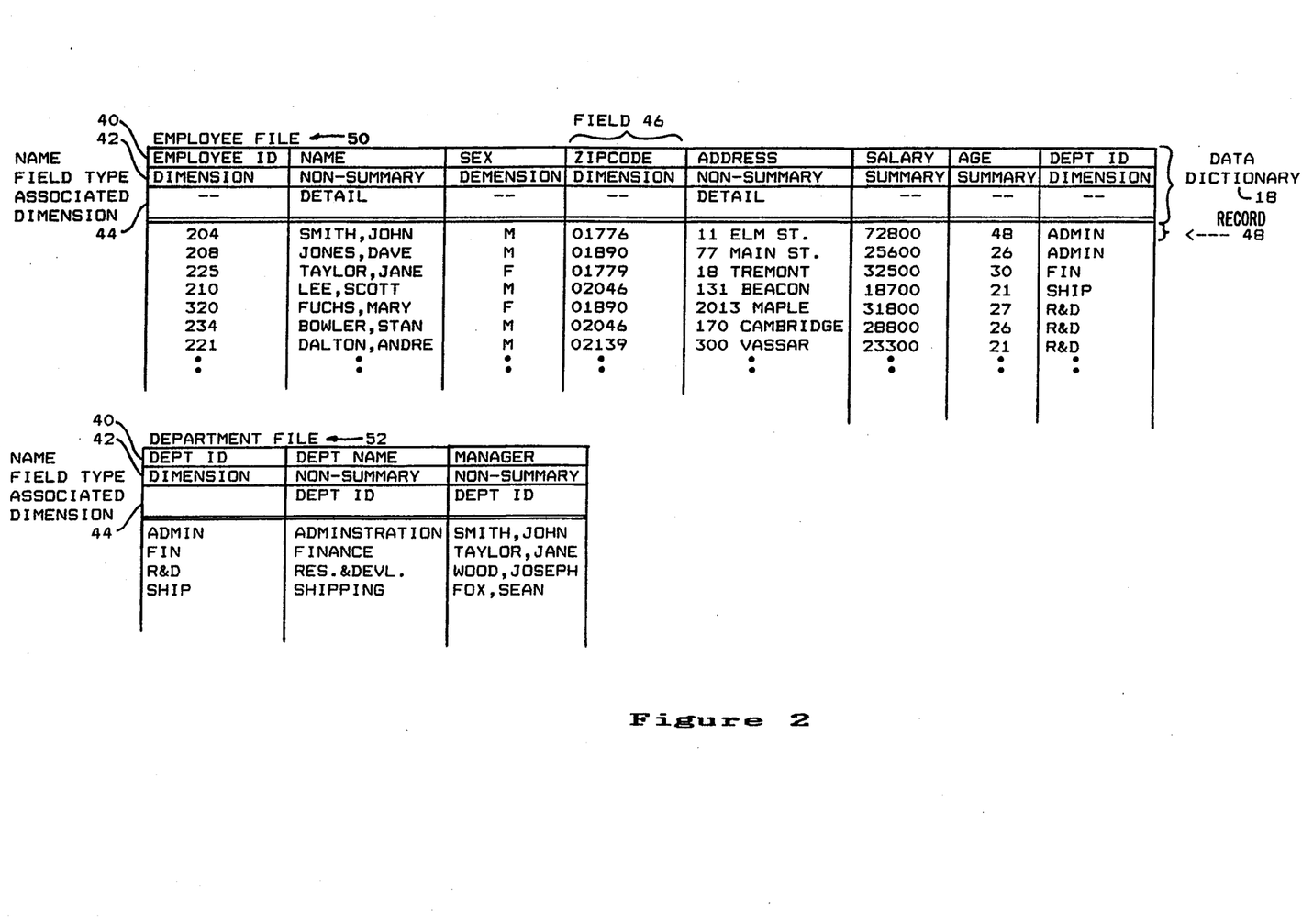
FIG. 2. shows sample data files, suitable as input to this invention, and the corresponding data dictionary.

FIG. 2. shows sample input data that can be used as input to the builder program 20. The input to the builder 20 is modelled as a set of flat files. Each flat file 50, 52 consists of a number of records 48, each of which describes a single entity. The records 48 are divided up into different fields 46, which represent different attributes of the entity. Multiple files are related by using a common field to perform a standard relational database join operation to produce a single logical file, with one record for each entity.

The data dictionary 18 of FIG. 1 is used to describe the fields in the input files, and assigns a type to each of the fields. The data dictionary contains three pieces of information about each field: a field name 40, a field type 42, and an associated dimension 44. The field name 40 is used to identify the information contained in the field. The field type 42 identifies the field as either a dimension, a summary field, or a non-summary field. The dimension field is a search key along which the data is organized and summarized. The summary field is a numeric quantity that provides useful information when summed and averaged. The non-summary field contains information that is associated with each input record, or with a value of the dimension field. The non-summary field would be a field that is not important enough to be a dimension field, or a field that is directly related to an existing dimension field. The associated dimension 44 is used for non-summary fields to identify the dimension field that the information is associated with, or "Detail" if the non-summary information is unique for each input record.

The example in FIG. 2 illustrates a personnel database, where each record 48 in an employee file 50 represents an employee of a company. The input files consist of the employee file 50, which contains data about each employee, and the department file 52, which contains information about the different departments. The department file 52 can be joined to the employee file 50 using the common Dept. Id. field. The data dictionary 18 describes the various fields of the input files, and identifies the fields as dimension fields, summary fields and non-summary fields. The Dept Name and Manager fields are non-summary fields associated with the Dept. Id dimension field. The Address and Name fields are non-summary fields associated with each input record. Alternatively, the address and name fields could have been associated with the Employee Id dimension field, since the Employee Id field is unique for each record.

Figure 3:
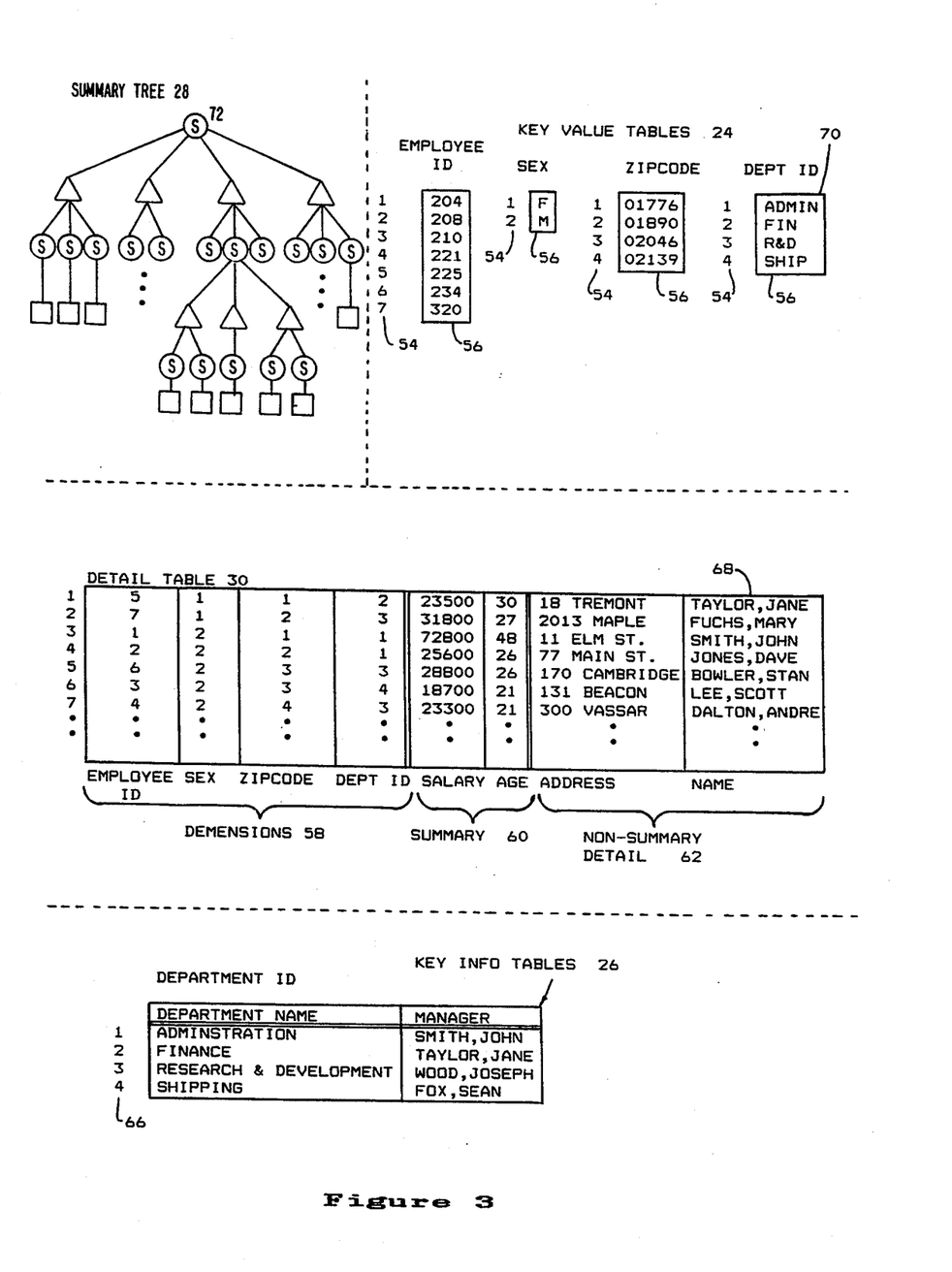
FIG. 3. gives a high-level view of the database, showing the major components.

FIG. 3 shows the major components of the database. The database comprises four parts: a summary tree 28, key value tables 24, a detail table 30, and key info tables 26.

The key value tables 24 provide mappings between integers 54 and the possible values 56 for the different dimension fields. For each dimension field in the input, there is a key value table, with entries for all values of that dimension field that appear in the input. The key value tables 24 allow dimension values to be represented as compact integers in the other parts of the database; the key value table can be indexed to convert these integers 54 into the actual dimension values 56. In the preferred embodiment of the invention, the key value tables 24 are sorted according to their natural sorting order, so that sorting the numbers associated with a key will result in sorting the key. In this example, the natural sorting order is alphabetical for alphanumeric dimension fields.

The detail table 30 is a relational table representing the input data in a tabular format. For each record in the input, there is an entry 68 in the table, containing dimension fields 58, summary data fields 60, and those non-summary data fields that are not associated with dimension fields. The dimension fields 58 are represented numerically as defined by their key value tables 24 to reduce the storage space needed.

The key info tables 26 are used to store information for non-summary fields associated with dimension fields. For each dimension field that has non-summary information associated with it, there exists a key info table 64. The key info table 64 is indexed 66 using the numeric ordering of the key as defined by the appropriate key value table 70. For each value of the dimension field, there is an entry in the key info table containing the information associated with that dimension value.

The summary tree 28 is used to summarize and index the detail table 30.

Figure 4:
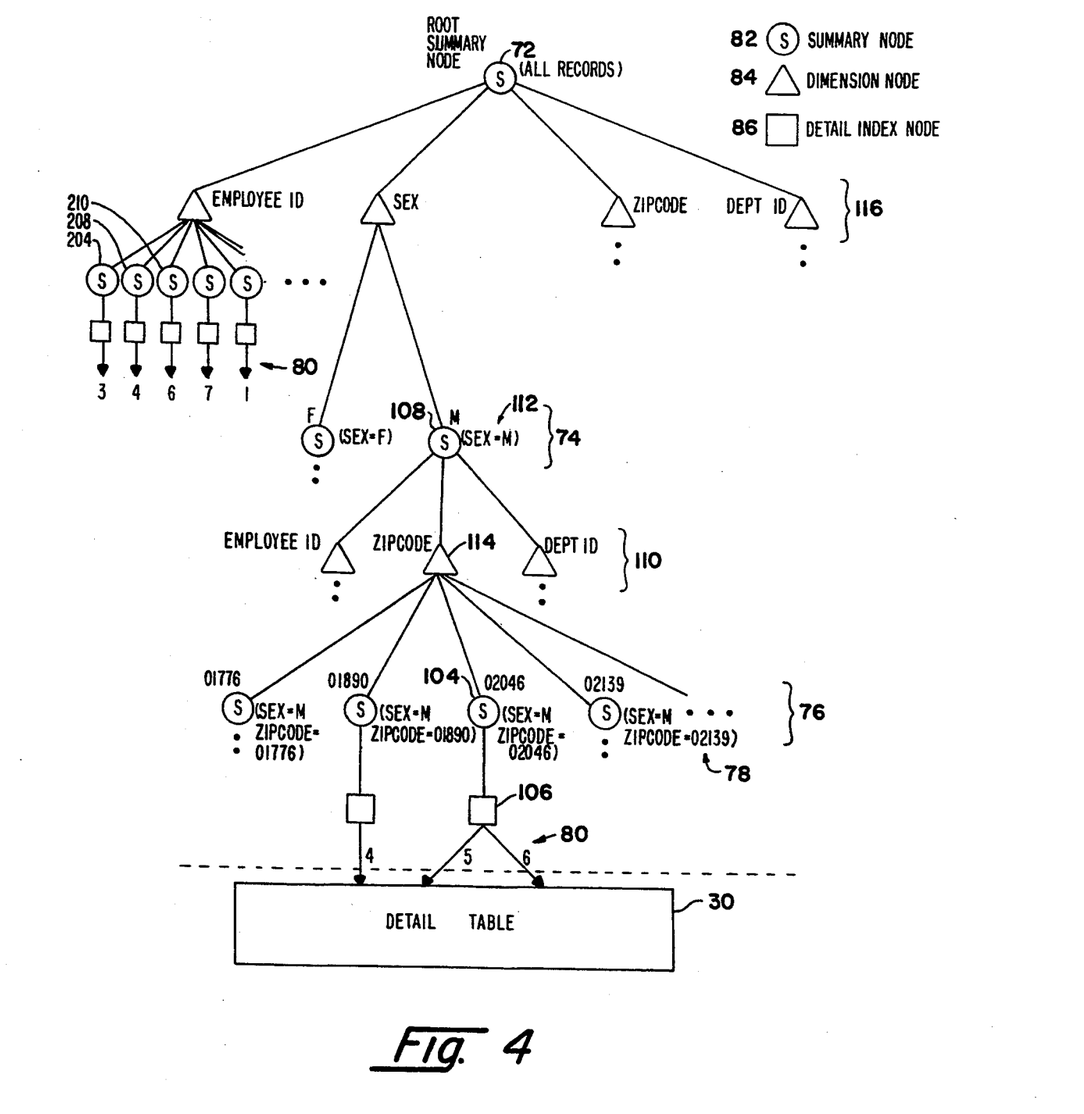
FIGS. 4. and 5 show the structure of the summary tree, which is used to access and organize the data along arbitrary dimension fields.

Referring to FIG. 4, a root summary node 72 summarizes the set of all records in the detail table 30, while lower levels 74, 76 summarize smaller sets, which are defined by the combination of different dimension values 78. Leaves 80 of the summary tree 72 are pointers to the detail table 30. The same detail record may appear several times in the summary tree 72. A node of the tree represents the set of detail records that are descended from that node. A summary node 82 will summarize the set of records, while a dimension node 84 will index that set of records along a certain dimension field, forming smaller sets. When the set is smaller than a certain threshold, the dimension nodes are replaced by a single detail index node 86, which contains pointers 80 to individual data records, thus reducing the branching of the summary tree. A detail index node 86 also replaces dimension nodes when the combination of dimension values 78 defining the set in the summary node includes all but one dimension value; the final dimension value would divide the set into very small subsets, which are not worth summarizing in the summary tree. This replacement should be made higher up in the tree if ancestor dimension nodes describe the exact same set as this detail index node; the intermediate dimension and summary nodes do not subdivide the set.

The summary tree 28 of FIG. 1 consists of three types of nodes: summary nodes 82, dimension nodes 84, and detail index nodes 86. Summary nodes 82 contain summary information, while dimension nodes 84 and detail index nodes 86 simply provide structure to the tree.

Figure 6:
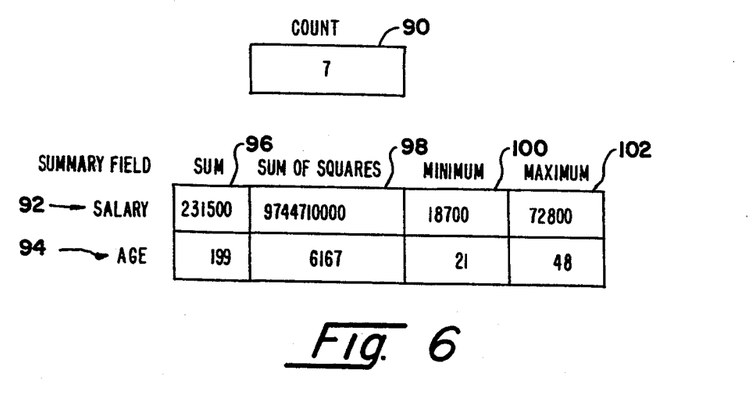
FIG. 6. shows the contents of a summary node.

As shown in FIG. 6, a summary node contains summary information for the set of records it represents. The summary node contains a count of records in the set 90, and summary information for each summary field 92, 94. This summary information would be the sum 96, the sum of squares 98, the minimum 100 and the maximum 102 of the set of values for the summary field.

The summary tree 28, as shown in FIG. 4, is structured so that the first level of the summary tree is a summary node 72, followed by alternating levels of dimension nodes and summary nodes until a detail index node is reached. If a summary node 104 represents fewer than a given threshold number of detail records, or if the summary node represents a set of records that differ in only one dimension field, the child of a summary node is a detail index node 106. Otherwise, the children of a summary node 108 are dimension nodes 110, one for each dimension field that has not yet been specified in the set 112 that the summary node represents. These dimension nodes 110 represent the same set as the summary node, causing detail records to be duplicated among these dimension nodes 110. The children of a dimension node 114 are summary nodes 76, one for each value of the given dimension in the set represented by the dimension node 114. These summary nodes 76 represent fewer detail records than the dimension node 114.

When a summary node 108 has dimension nodes 110 as children, each dimension node represents the same set of detail records. Each detail record in the set is a descendent of all the dimension nodes 110, creating duplication in the tree. If the tree summarizes n dimensions, the first level of dimension nodes 116 will cause detail records to appear n times. The second level will cause detail records to appear n(n-1) times. If the tree were fully developed, the dimension branching would cause each record to appear in the tree n! times. The detail index nodes reduce this number by cutting off the dimension nodes at a certain level.

Figure 5:
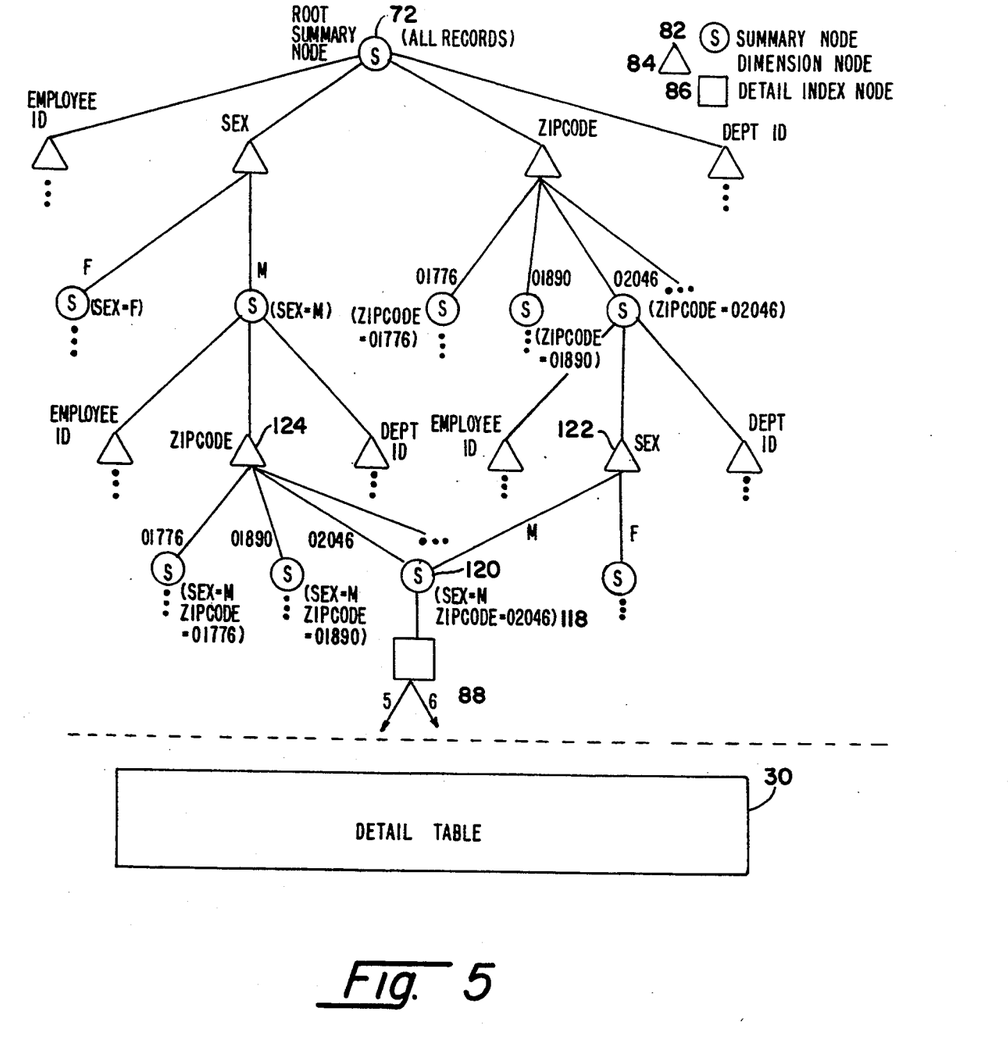
FIG. 5 shows the summary tree with sharing subtrees.

FIG. 5 illustrates another technique for eliminating redundancy. Subtrees of the summary tree are shared where possible. In the summary tree, a summary node representing the same set of records appears in several places of the tree, depending on the order of dimensions used to access it. For instance, the summary node 120 representing the set of records with dimension field SEX having value M and dimension field ZIPCODE having value 02046 is in a different part of the tree than the summary node representing records with dimension field ZIPCODE having value 02046 and dimension field SEX having value M. The corresponding subtree 88 could be shared among different parts of the tree 122, 124, reducing the duplication.

In the preferred embodiment of the invention, the summary tree is represented using tables. This provides a compact representation of the tree, and provides locality of reference for accessing brother summary nodes under the same dimension node.

Figure 7:
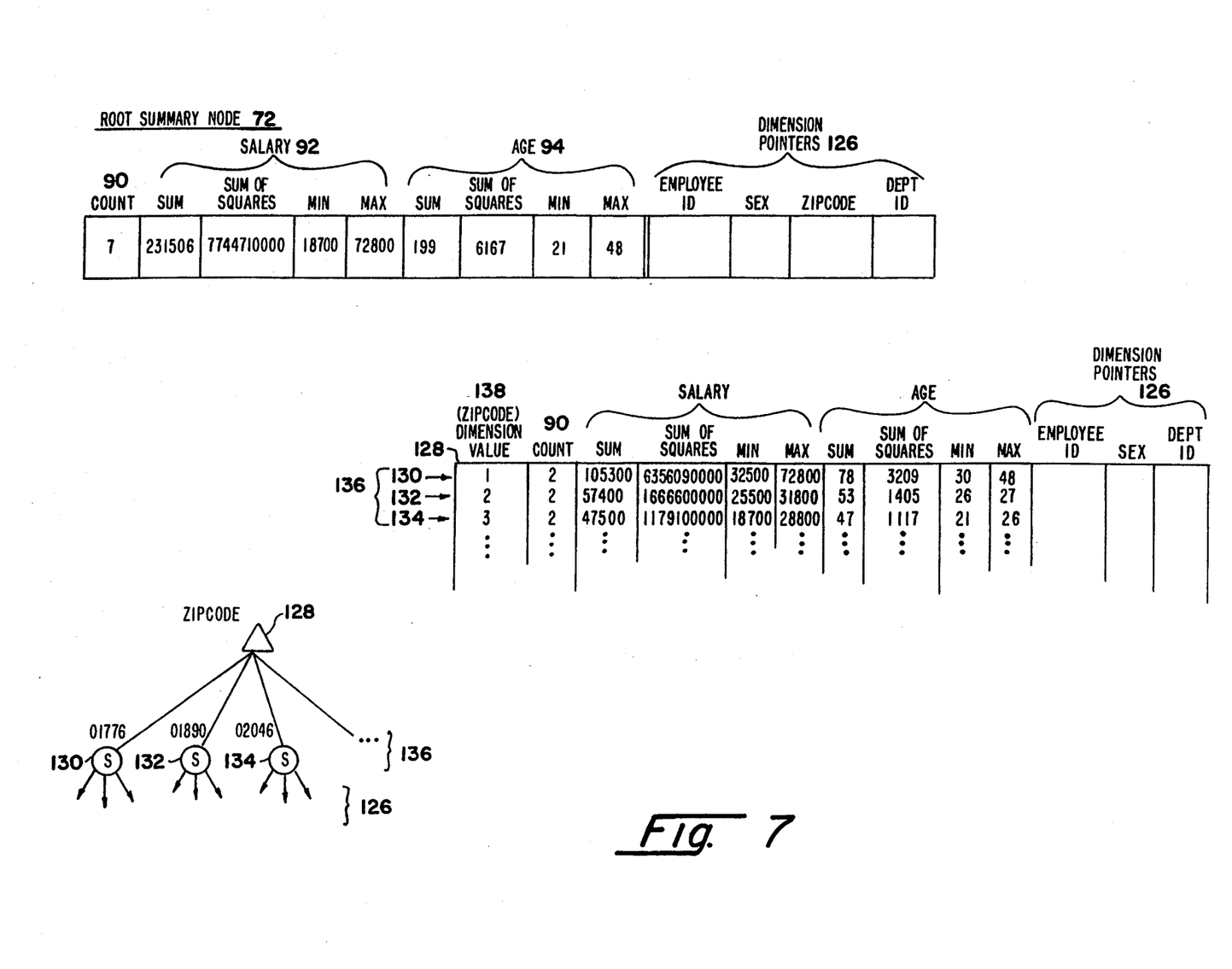
FIG. 7. shows how the summary tree can be represented in a tabular format.

FIG. 7 shows the correspondence between the logical structure of the summary tree and a tabular representation of the tree. The root summary node 72 can be represented as a table with a single row. The row contains a count 90 of records in the database, summary information for the summary fields 92, 94, and dimension pointers 126 to tables representing the child dimension nodes.

A dimension node 128 and its child summary nodes 136 can be represented using a two-dimensional table. Each row represents a summary node; each row contains the dimension value 138 which identifies the summary node, the count 90 of records in the set, the summary information for the summary fields, and dimension pointers 126 to tables representing child dimension nodes or detail index nodes.

Figure 8:
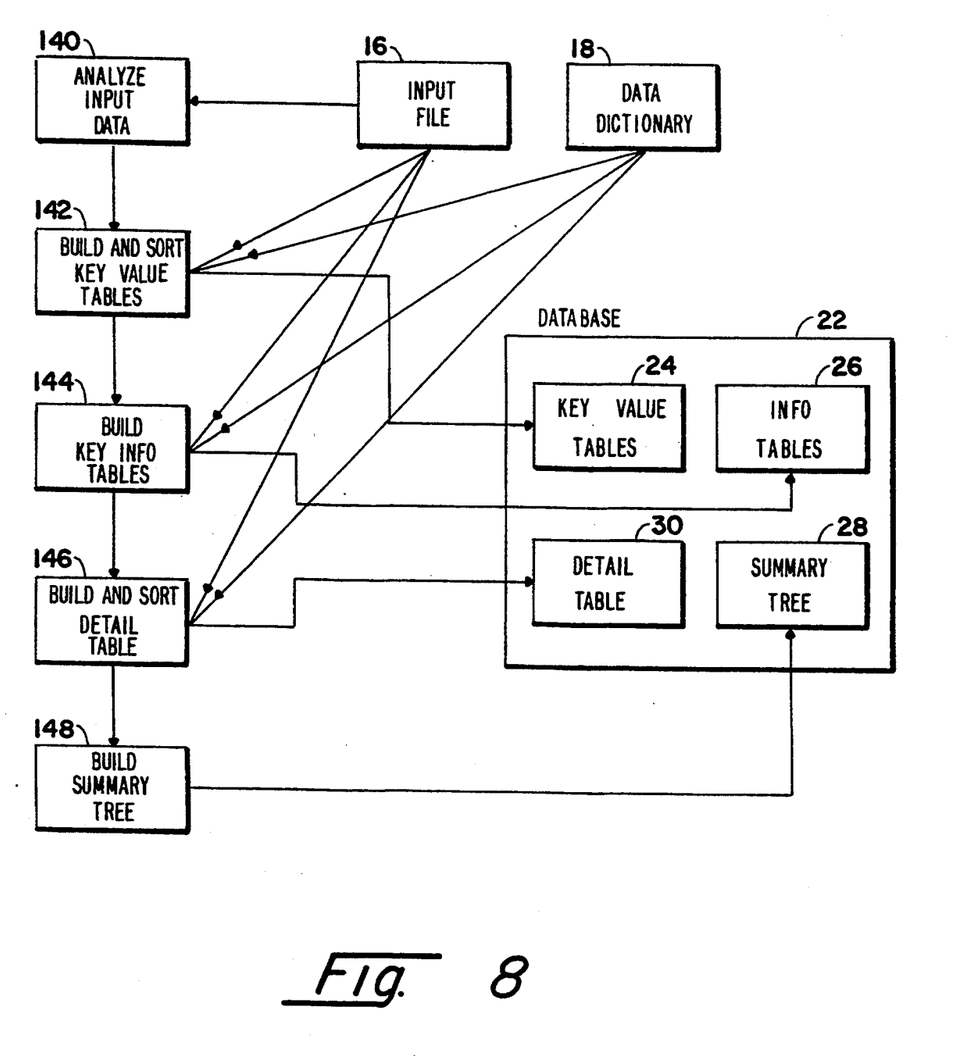
FIG. 8. shows the builder program, which builds the database.

A flow chart for the builder program 20 is shown in FIG. 8. The builder program makes several passes on the input, generating the different parts of the summary tree database. Step 140 analyzes the input file 16 to determine the types, sizes and value ranges for the input fields. Step 142 creates the key value tables 24 by reading the input, and maintaining tables for each dimension field in main memory 12 of unique dimension values. These tables are sorted, and written out as key value tables 24. Step 144 creates the key info tables 22, by reading the input file 16, and storing the non-summary field values into the appropriate key info table. Step 146 creates the detail table 30 by reading each input record, translating the dimension values into their corresponding numeric indexes using the key value tables 24, and storing the dimension values, the summary fields, and the appropriate non-summary fields into the detail table 30.

The detail table 30 is sorted to provide some locality of reference, so that similar entries are located in the same area of secondary storage. In the preferred embodiment of the invention, this is a multiple-key sort on all dimension fields, where the dimension fields are ordered by the number of unique values they have; the dimension field with the least number of unique values is the primary key, while the dimension field with the most number of values is the least significant key. This means that detail records near each other in the detail tables share the most number of possible dimension values. When reading in from secondary storage all records that match a certain combination of dimension values, these related records can be read at one time without performing too many expensive disk seeks.

Figure 9:
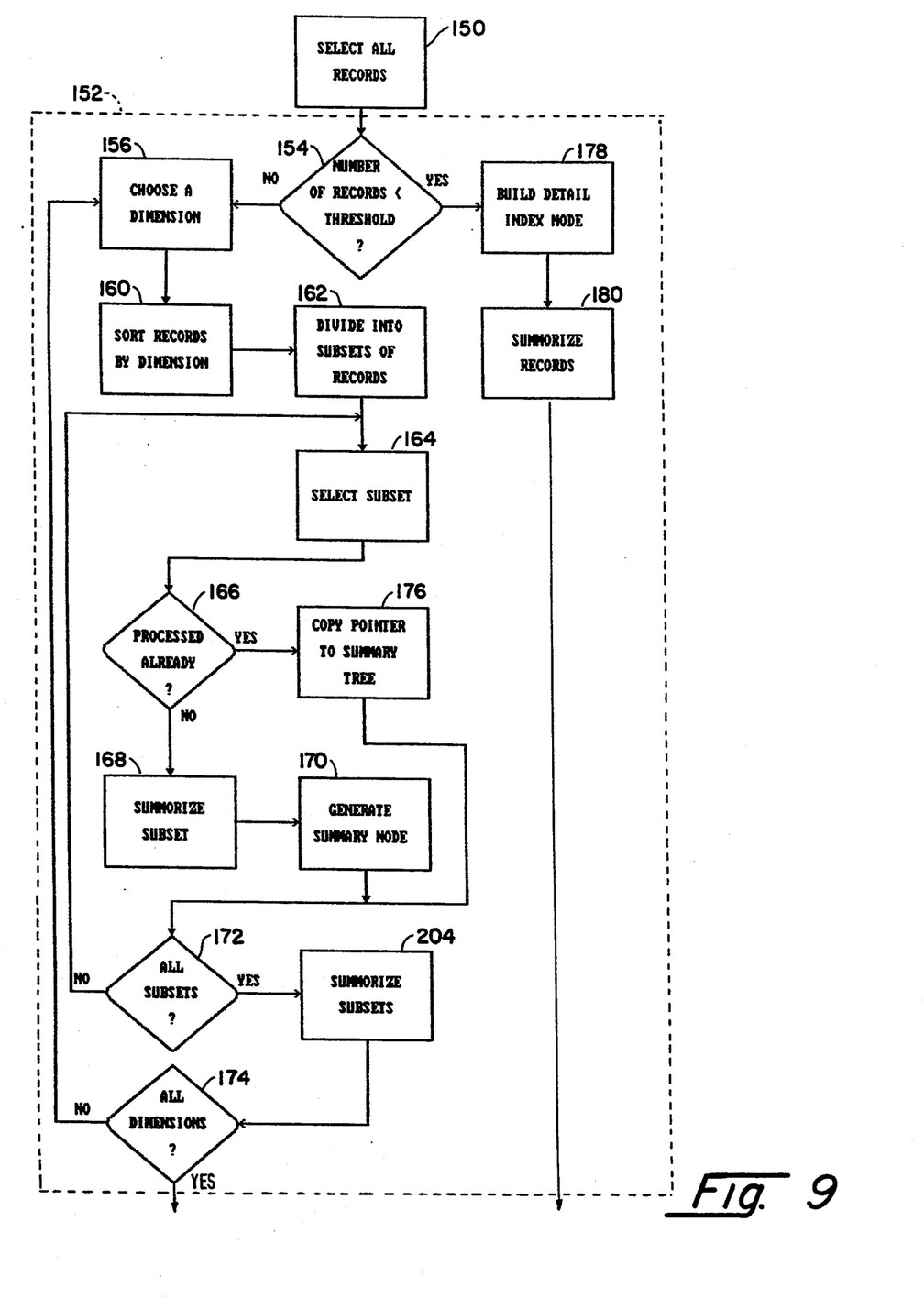
FIG. 9. shows how the summary tree portion of the database is built.

Step 148 creates the summary tree 28 itself. This is a recursive process that creates the tree in a top-down manner and summarizes the sets in a bottom-up manner. FIG. 9 illustrates this step in more detail. Step 150 selects all records in the detail table 30. Block 152 represents the recursive process of summarizing a set of records and producing summary information; it is used recursively at Step 168. Step 154 checks if the number of records is smaller than the given threshold, or no dimension fields are left to summarize on; if so, Step 178 builds a detail index node, using the record numbers of the current set of records. Step 180 reads in the set of records from the detail table, and calculates summary information from this set.

If the number of records is larger than the threshold and dimension fields remain, for each remaining dimension field 156 the records are sorted along that dimension field 160, and the records are divided into subsets according to different values of that dimension field 162. For each subset, the current summary tree built so far is examined in Decision Step 166 to see if the same subset has been built using a different order of dimension fields. If so, a pointer to the appropriate subtree is placed into this part of the tree in Step 176 to accomplish the sharing described in FIG. 5. If the subset has not yet been processed, Step 168 is a recursive call to the current procedure to summarize this subset, and build a subtree and a summary node in Step 170. This process continues for all subsets of records in Decision Step 172. The summary information of these subsets are combined in Step 204 to generate summary information for the current set of records. Sum values are added together, and minimums and maximums combined to create the contents of a summary node. This summary node is returned from the recursive procedure 152 to be placed in the proper place in the summary tree.

Figure 10:
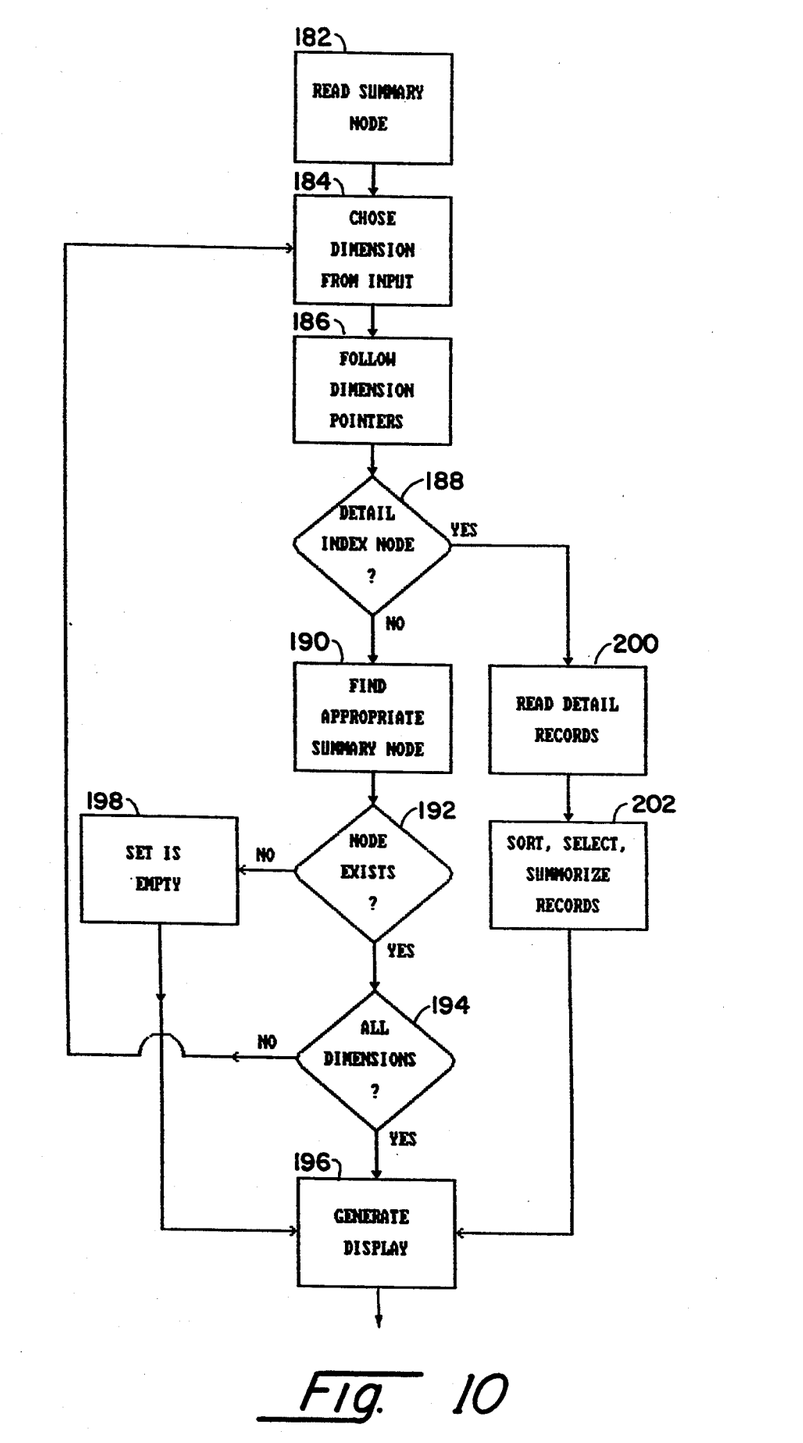
FIG. 10. shows the diver program, and how it accesses the database to provide summary information to the user.

FIG. 10 illustrates the logic of the Diver program 32 and how it uses the database 22 to present summary information to the End user 36 given a set of dimension selections 34. The dimension selections 34 specifies dimension values for a set of dimension fields, selecting a set of detail records. At Step 182, the root summary node 72 of the summary tree 28 is read into main memory 12. Step 184 chooses a dimension from the dimension selections. Step 186 follows the appropriate dimension pointer to its target node. If this node is a detail index node 188, then this detail index node contains a superset of the desired set. Step 200 reads the detail records from the detail table 30, which are then sorted 202 according to their dimension values of the dimension selections 34. The subset of records that match the dimension selections 34 are selected and summarized to produce the desired summary information.

If the target node of Step 186 is a not a detail index node, it is a dimension node. Step 190 finds a child summary node of this dimension node that has the dimension value that matches the dimension selection. If no summary node exists 192, no records match 198 the dimension selections, and the appropriate display is generated 196. If the summary node exists and more dimension selections remain, Steps 184 through 192 are repeated until all dimension selections have been used. When all dimension selections have been used, the summary node contains the summary information for the desired input set. The appropriate display 196 is generated to present this summary information and other derived information, such as averages and standard deviations, to the user.

While the invention has been shown and described with reference to the preferred embodiment thereof, it will be understood by those skilled in the art that the above and other changes in form and detail may be made therein without departing from the spirit and scope of the invention.

We claim:

1. A method for accessing a summarized database including the steps of:

A. providing a combination of dimension values to identify a desired set of database records;

B. searching a plurality of dimension nodes including detail index nodes and summary nodes to locate a dimension node corresponding to the combination of dimension values and C. reading the corresponding dimension node to identify when a corresponding detail index node corresponds to the combination of dimension values and when a corresponding summary node corresponds to the combination of dimension values;

D. when a detail index node corresponds to the combination of dimension values, reading from the corresponding detail index node a record pointer identifying corresponding detail records in a detail table;

E. reading the indexed detail records identified by the record pointer; and

F. calculating summary information from the set of detail records corresponding to the combination of dimension values when the dimension node corresponding to the combination of dimension values node is a detail index node;

G. when a summary node corresponds to the combination of dimension values, reading from the summary node summary values determined from the detail records corresponding to the combination of dimension values and stored in the summary node;

H. displaying the summary information calculated from the set of detail records corresponding to the combination of dimension values when the combination of dimension values corresponds to a detail index node; and I. displaying the summary values read from the corresponding summary node when the combination of values corresponds to a summary node.

2. The method of claim 1 whereby using said dimension node means includes the steps of:

J. selecting a dimension value from the combination of dimension values;

K. reading from a root summary node of the dimension nodes a dimension pointer corresponding to the selected dimension value;

L. determining a dimension node identified by the dimension pointer corresponding to the selected dimension value;

M. determining when the dimension node identified by the dimension pointer is a summary node and when the dimension node identified by the dimension pointer is a detail node;

N. when the dimension node is a detail index node, reading the detail records indexed by the detail index node;

O. sorting and selecting a subset of detail records identified by said combination of dimension values;

P. summarizing information from the subset of detail records;

Q. when the dimension node is a summary node, displaying the summary information contained in summary node if all dimension values have been selected;

O. repeating steps J through Q using remaining dimension values from combination of dimension values to traverse said summary tree when all dimension values have not been selected.

3. The method of claim 2 wherein
the dimension node is represented as a two-dimensional table containing a plurality of rows, each row of said table being a summary node; and
identifying the dimension node identified by the dimension pointer to a summary node includes searching the dimension node for the entry matching the dimension value.

* * * * *